United States Patent
Jeong et al.

(10) Patent No.: US 8,253,317 B2
(45) Date of Patent: Aug. 28, 2012

(54) FIELD EMISSION LAMP

(75) Inventors: Jin Woo Jeong, Daejeon (KR); Yoon Ho Song, Daejeon (KR); Dong Il Kim, Daejeon (KR); Jae Woo Kim, Daejeon (KR); Jun Tae Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 47 days.

(21) Appl. No.: 12/842,523

(22) Filed: Jul. 23, 2010

(65) Prior Publication Data

US 2011/0148310 A1 Jun. 23, 2011

(30) Foreign Application Priority Data

Dec. 21, 2009 (KR) .................. 10-2009-0128373
May 10, 2010 (KR) .................. 10-2010-0043527

(51) Int. Cl.
*H01J 1/62* (2006.01)
(52) U.S. Cl. .................. 313/495; 445/24
(58) Field of Classification Search .......... 313/495–497, 313/294, 306, 309–311, 351, 346 R, 336; 445/24

See application file for complete search history.

(56) References Cited

U.S. PATENT DOCUMENTS

| | | | | |
|---|---|---|---|---|
| 5,587,816 A | * | 12/1996 | Gunjima et al. | 349/62 |
| 7,541,731 B2 | * | 6/2009 | Sata et al. | 313/496 |
| 7,731,556 B2 | * | 6/2010 | Okanan et al. | 445/24 |
| 7,768,190 B2 | * | 8/2010 | Jun | 313/495 |
| 2007/0200486 A1 | * | 8/2007 | Okanan et al. | 313/496 |
| 2007/0284997 A1 | * | 12/2007 | Jun | 313/495 |
| 2009/0053962 A1 | * | 2/2009 | Oh | 445/24 |
| 2009/0243992 A1 | | 10/2009 | Gorog | |
| 2009/0316067 A1 | * | 12/2009 | Lee et al. | 349/61 |

FOREIGN PATENT DOCUMENTS

| | | |
|---|---|---|
| JP | 2002-281517 A | 9/2002 |
| JP | 2009-238614 A | 10/2009 |
| KR | 2006-0076936 A | 7/2006 |
| KR | 2007-0054038 A | 5/2007 |
| KR | 2009-0024723 A | 3/2009 |
| WO | WO-2008076109 A | 6/2008 |

OTHER PUBLICATIONS

Yoon-Ho Song et al., "Color-Sequential Field-Emission Lamp for Advanced Back Lighting in LCD", IDW '09, Dec. 10, 2009, pp. 1455-1456.

* cited by examiner

*Primary Examiner* — Peter Macchiarolo
(74) *Attorney, Agent, or Firm* — Rabin & Berdo, P.C.

(57) ABSTRACT

Provided is a field emission lamp (FEL), which includes a plurality of cathode electrodes formed above a first substrate, an anode electrode formed under a second substrate to face the cathode electrode, a fluorescent layer composed of red, green and blue (RGB) patterns formed alternately on the anode electrode in an oblique direction, and a plurality of emitters formed on the cathode electrodes to correspond to the RGB patterns. According to the present invention, as an FEL having a fast response time is used as a backlight unit, a color breaking phenomenon can be prevented in a color sequential driving method.

14 Claims, 5 Drawing Sheets

FIELD EMISSION LAMP

CROSS-REFERENCE TO RELATED APPLICATION

This application claims priority to and the benefit of Korean Patent Application Nos. 10-2009-0128373, filed Dec. 21, 2009 and 10-2010-0043527, filed May 10, 2010, the disclosure of which is incorporated herein by reference in its entirety.

BACKGROUND

1. Field of the Invention

The present invention relates to a field emission lamp (FEL), and more particularly, to an FEL having a fast response time capable of being used as a backlight unit of a liquid crystal display device.

2. Discussion of Related Art

Liquid crystal display (LCD) devices provide a voltage to each pixel in a liquid crystal panel according to an input image signal to display images by controlling light transmission of the pixels, and are generally used in laptop computers, desktop computers, LCD-TVs and mobile communication terminals.

Color display methods of LCD devices are classified into a space division method of displaying various colors by spatially mixing spatially divided pixels having unit colors (e.g., red, green and blue (RGB)), a color sequential driving method of displaying various colors by temporally mixing unit colors expressed sequentially, and a field sequential color driving method.

Here, in the color sequential driving method, a total frame on a liquid crystal panel is separated into sub-frames of a unit color (e.g., RGB), and backlight units include a single color light source of a unit color, respectively. Accordingly, when unit color lights are sequentially turned on for a short time, the unit colors may be temporally mixed together, thereby expressing various colors without color filters.

Conventionally, as the backlight unit of the LCD device, a cold cathode fluorescent lamp (CCFL) or light emitting diode (LED) has generally been used.

However, the CCFL causes environmental contamination because of the use of mercury (Hg) gas, has low response time and color reproduction, and is not suitable to making a panel lighter, thinner, shorter and smaller.

The LED is eco-friendly, compared to the CCFL. However, when a large amount of LEDs are used to increase light intensity, the production cost and heat may increase. In addition, although the LED has a faster response time compared to the CCFL, it is not enough to prevent color breaking occurring in the color sequential driving method.

Meanwhile, recently, local dimming, which is a technique to individually control a backlight unit, has been proposed. According to the local dimming technique, a backlight unit is selectively turned off at a dark side of an image, thereby reducing power consumption, increasing contrast ratio and reducing afterimages.

To apply such a local dimming technique to LCD devices, several hundreds of backlight units are needed. Thus, when LEDs are used as the backlight units, as described above, the production cost and heat increase.

SUMMARY OF THE INVENTION

The present invention is directed to a field emission lamp (FEL) for a backlight unit, which is suitable for an LCD device driven by a color sequential local dimming method.

One aspect of the present invention provides an FEL, including: a plurality of cathode electrodes formed above a first substrate; an anode electrode formed under a second substrate to face the cathode electrodes; a fluorescent layer composed of red, green and blue (RGB) patterns formed alternately on the anode electrode in an oblique direction; and a plurality of emitters formed on the cathode electrodes to correspond to the RGB patterns.

BRIEF DESCRIPTION OF THE DRAWINGS

The above and other objects, features and advantages of the present invention will become more apparent to those of ordinary skill in the art by describing in detail preferred embodiments thereof with reference to the attached drawings in which.

DETAILED DESCRIPTION OF EXEMPLARY EMBODIMENTS

Figure 1:
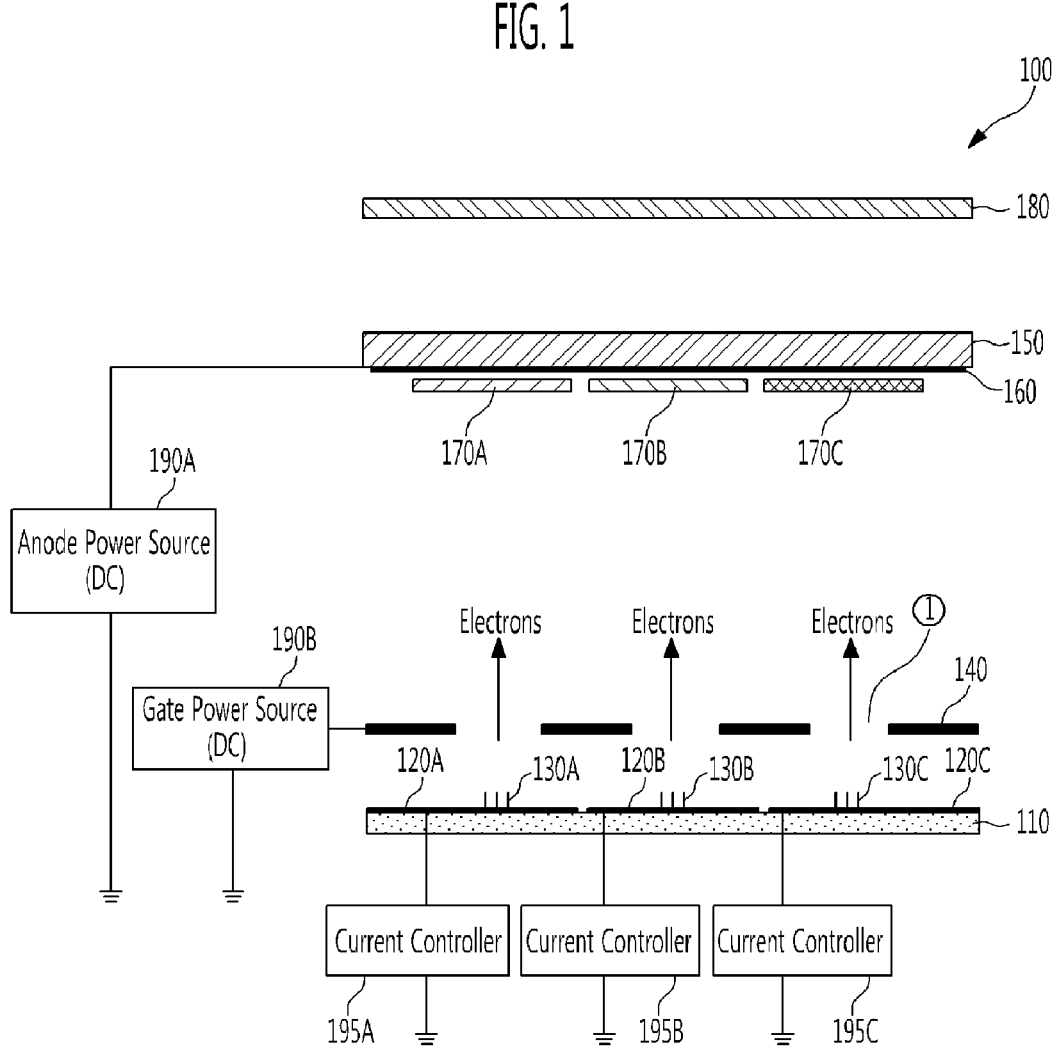
FIG. 1 illustrates a field emission lamp (FEL) according to an exemplary embodiment of the present invention.

Hereinafter, the present invention will be described with reference to the accompanying drawings in detail. This invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout the specification. In the drawings, the thickness of layers and regions are exaggerated for clarity.

FIG. 1 illustrates a field emission lamp (FEL) according to an exemplary embodiment of the present invention.

As shown in FIG. 1, an FEL 100 according to the exemplary embodiment of the present invention includes a plurality of cathode electrodes 120A, 120B and 120C formed above a first substrate 110, an anode electrode 160 disposed under a second substrate 150 to face the cathode electrodes 120A, 120B and 120C, fluorescent layers 170A, 170B and 170C composed of red, green and blue (RGB) patterns, which are formed alternately on the anode electrode 160 and arranged in an oblique direction, and a plurality of emitters 130A, 130B and 130C formed on the cathode electrodes 120A, 120B and 120C to correspond to the RGB patterns.

In addition, the FEL 100 may further include a gate electrode 140 located between the cathode electrodes 120A, 120B and 120C and the anode electrode 160 and having an opening at a location corresponding to the emitters 130A, 130B and 130C, and a diffusion plate 180 formed above the second substrate 150 to mix RGB light emitted from the fluorescent layers 170A, 170B and 170C together.

The FEL 100 may further include an anode power source 190A providing a high DC voltage to the anode electrode 160 and a gate power source 190B providing a high DC voltage to the gate electrodes 140.

The cathode electrodes 120A, 120B and 120C are spaced apart from each other, and thus electrically separated. Particularly, the cathode electrodes 120A, 120B and 120C are formed to correspond to the fluorescent patterns of the fluorescent layers 170A, 170B and 170C, respectively.

The emitters 130A, 130B and 130C serve to emit electrons, and project from surfaces of the cathode electrodes 120A, 120B and 120C. When voltage difference between the cathode electrodes 120A, 120B and 120C and the gate electrode 140 has a higher value than a threshold voltage, the emitters 130A, 130B and 130C emit electrons.

The gate electrode 140 serves to induce field emission from the emitters 130A, 130B and 130C. The gate electrode 140 is formed on the cathode electrodes 120A, 120B and 120C, and an insulating layer or spacer (not shown) is interposed between the cathode electrodes 120A, 120B and 120C and the gate electrode 140.

Current controllers 195A, 195B and 195C may be connected between the cathode electrodes 120A, 120B and 120C and a ground voltage, and may be implemented by a MOS field effect transistor (MOSFET). When the current controllers 195A, 195B and 195C are activated, they may connect the cathode electrodes 120A, 120B and 120C with the ground electrode, or when the current controllers 195A, 195B and 195C are inactivated, they may separate the cathode electrodes 120A, 120B and 120C from the ground electrode, thereby controlling field emission currents flowing through the cathode electrodes 120A, 120B and 120C, respectively.

An operation of the FEL having the above-described structure will be described.

When the current controllers 195A, 195B and 195C are activated (ON), the cathode electrodes 120A, 120B and 120C are grounded, and a sufficient voltage to cause field emission is applied to both ends of each cathode electrode 120A, 120B or 120C, electrons are emitted from the emitters 130A, 130B and 130C.

The emitted electrons are accelerated by a DC voltage applied to the anode electrode 160, and thus collide with the RGB fluorescent patterns 170A 170B and 170C, resulting in emission of RGB light.

Figure 2:
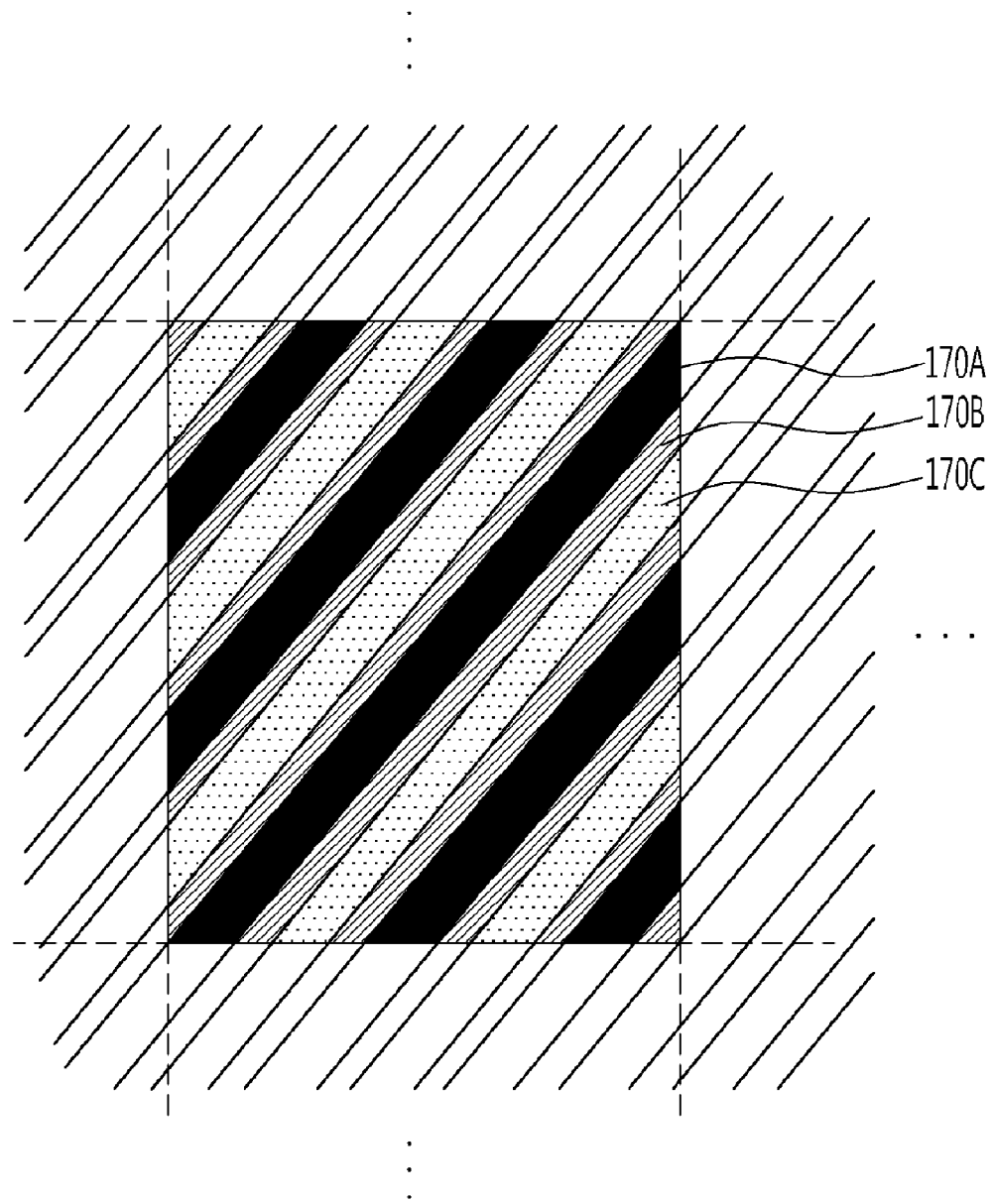
FIG. 2 illustrates a fluorescent layer according to an exemplary embodiment of the present invention.

FIG. 2 illustrates a fluorescent layer according to an exemplary embodiment of the present invention. For the convenience of description, the fluorescent layer is illustrated only in one single block, and peripheral blocks are drawn with dotted lines.

As shown in FIG. 2, the fluorescent layers 170A 170B and 170C are composed of a plurality of fluorescent patterns expressing unit colors. In FIG. 2, for example, the fluorescent layers are composed of three fluorescent patterns of RGB colors. In addition, while FIG. 2 shows that the fluorescent RGB patterns are disposed alternately, this is only for the convenience of description, and the fluorescent patterns may be disposed in various orders.

The fluorescent layers 170A 170B and 170C are composed of RGB patterns 170A, 170B and 170C, which are formed alternately. The RGB patterns 170A, 170B and 170C are formed in the shape of a line, which extends in an oblique direction. That is, the patterns 170A, 170B and 170C are arranged in an oblique direction, not in a horizontal or vertical direction, so that a longest dimension of each pattern 170A, 170B and 170C extends in the oblique direction.

When the RGB patterns are arranged in a horizontal or vertical direction, only one kind of a fluorescent pattern is arranged on an edge of a block. For this reason, white light cannot be created by mixing the light of three colors. On the other hand, when the RGB patterns 170A, 170B and 170C are formed at a predetermined angle in an oblique direction, all three unit colors are arranged on an edge of the block, and, thus, such a problem can be resolved.

Figure 3:
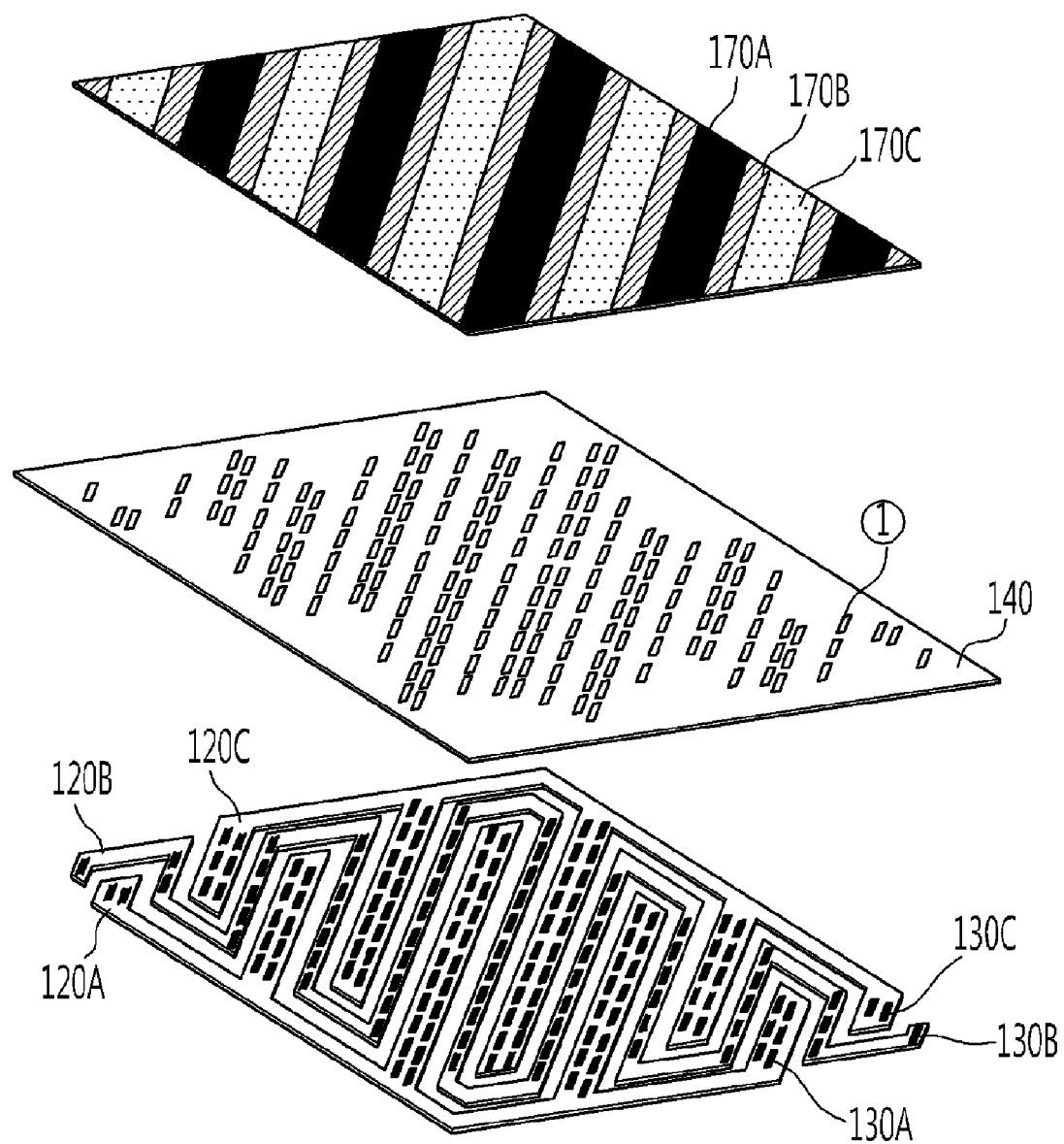
FIG. 3 illustrates the configuration of unit blocks of an FEL according to an exemplary embodiment of the present invention.

FIG. 3 illustrates the configuration of unit blocks of an FEL according to an exemplary embodiment of the present invention.

As described above, an FEL according to the exemplary embodiment includes a unit block composed of a plurality of cathode electrodes 120A, 120B and 120C, a plurality of emitters 130A 130B and 130C, and fluorescent layers 170A 170B and 170C, and a plurality of such unit blocks are included in the FEL.

The configuration of a single unit will be described in detail.

The cathode electrodes 120A, 120B and 120C cross to correspond to the RGB patterns 170A 170B and 170C, which are arranged in an oblique direction, respectively.

The first cathode electrode 120A is formed in a finger type. Here, the finger type is composed of a plurality of lines extending in parallel in a predetermined direction and connectors connecting ends of one sides of the lines. In the present invention, as the finger-type first cathode electrodes 120A are arranged in an oblique direction, the lines are also arranged at a predetermined angle in a diagonal direction. In addition, the connectors are formed in the shape of a "┐"or "└" along the edge of the unit block.

Since the second cathode electrode 120C also has a finger type, it crosses the first cathode electrode 120A. That is, the second cathode electrode 120C is symmetrically disposed to the first cathode electrode 120A, and the lines of the respective electrodes cross each other.

The third cathode electrode 120B is formed in a line type, and arranged between the first and second cathode electrodes 120A and 120C. That is, the third cathode electrode 120B is formed between the lines of the first cathode electrode 120A and the second cathode electrode 120C, and thereby is formed in a zigzag shape.

In other words, the first cathode electrode 120A is arranged to correspond to the red pattern 170A, the second cathode electrode 120C is arranged to correspond to the blue pattern 170C, and the third cathode electrode 120B is arranged to correspond to the green pattern 170B.

A plurality of emitters 130A, 130B and 130C formed on the same cathode electrode 120A, 120B or 120C are electrically connected with each other. In addition, the emitters 130A, 130B and 130C formed on the same cathode electrode 120A, 120B or 120C correspond to the same fluorescent pattern 170A, 170B or 170C.

A gate electrode 140 has a plurality of openings ① corresponding to the emitters 130A, 130B and 130C, respectively.

Thus, electrons emitted from the emitters 130A, 130B and 130C formed on the same cathode electrode 120A, 120B or 120C collide with the same fluorescent pattern 170A 170B or 170C, thereby emitting light of the same color.

Figure 4:
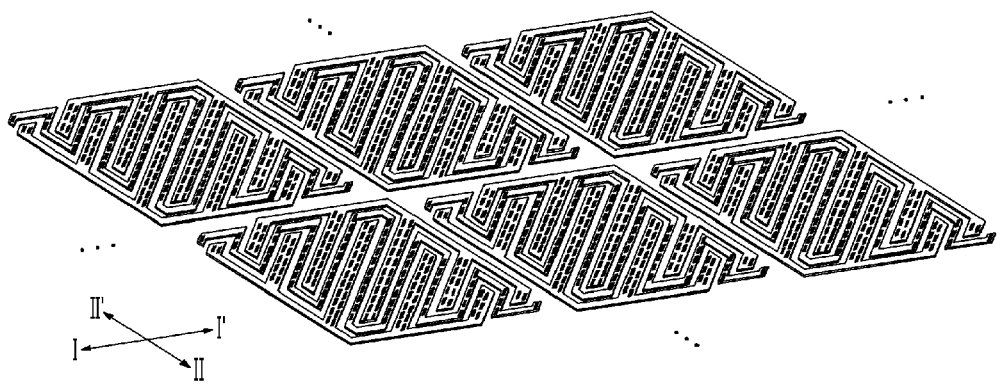
FIG. 4 illustrates the arrangement of a cathode electrode of an FEL according to an exemplary embodiment of the present invention, particularly when a plurality of unit blocks are disposed.

FIG. 4 illustrates the arrangement of a cathode electrode of an FEL according to an exemplary embodiment of the present invention, particularly when a plurality of unit blocks are disposed.

As shown in FIG. 4, an FEL according to the exemplary embodiment of the present invention includes a plurality of unit blocks arranged in a first direction (I-I') and a second direction (II-II') intersecting with the first direction (I-I').

Thus, unit colors may be sequentially emitted using the FEL including the unit blocks as a backlight unit, and thus brightness may be controlled for each block. That is, when a local dimming technique is applied to an LCD device, a contrast ratio may be increased and afterimages may be improved.

Figure 5:
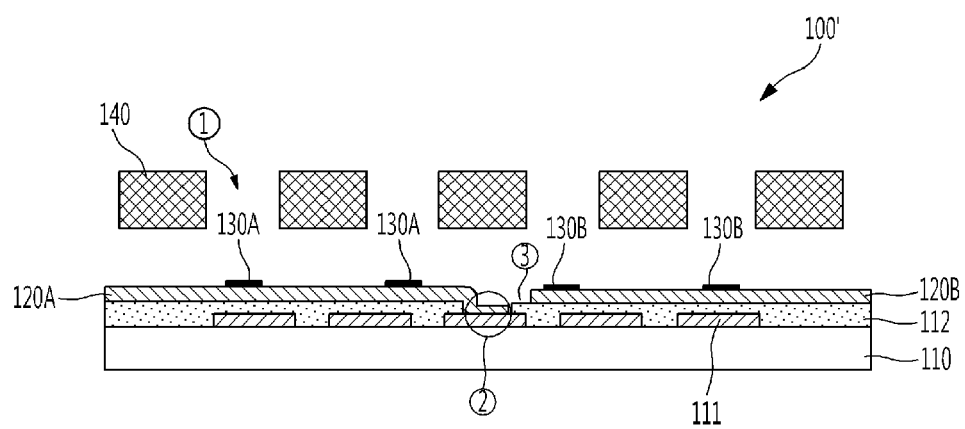
FIG. 5 illustrates the configuration of an FEL according to an exemplary embodiment of the present invention, particularly when a data electrode is included.

FIG. 5 illustrates the configuration of an FEL according to an exemplary embodiment of the present invention, particularly when a data electrode is included.

As described with reference to FIG. 4, when the FEL includes a plurality of unit blocks, a terminal connected with an external device is required to control each of the unit blocks. Accordingly, in the present embodiment, a plurality of data electrodes are formed to respectively control the unit blocks. Other components are configured in the same manner as described above, and thus the description thereof will be omitted.

As shown in FIG. 5, an FEL 100' according to the exemplary embodiment of the present invention is interposed between a first substrate 110 and cathode electrodes 120A, 120B and 120C, and includes a plurality of data electrodes 111 connected with the cathode electrodes 120A, 120B and 120C, respectively.

Here, an interlayer insulating layer 112 is provided between the cathode electrodes 120A, 120B and 120C and the data electrodes 111, and an opening ② exposing the data electrodes 111 is provided in a part of the interlayer insulating layer 112.

In addition, one 120A of the cathode electrodes 120A, 120B and 120C is connected with one 111A of the data electrodes 111 through the opening ②. Thus, the cathode electrodes 120A, 120B and 120C may be individually controlled by the data electrodes 111.

As described above, the cathode electrodes 120A, 120B and 120C are spaced a predetermined distance from each other, and thus are insulated from each other.

Figure 6:
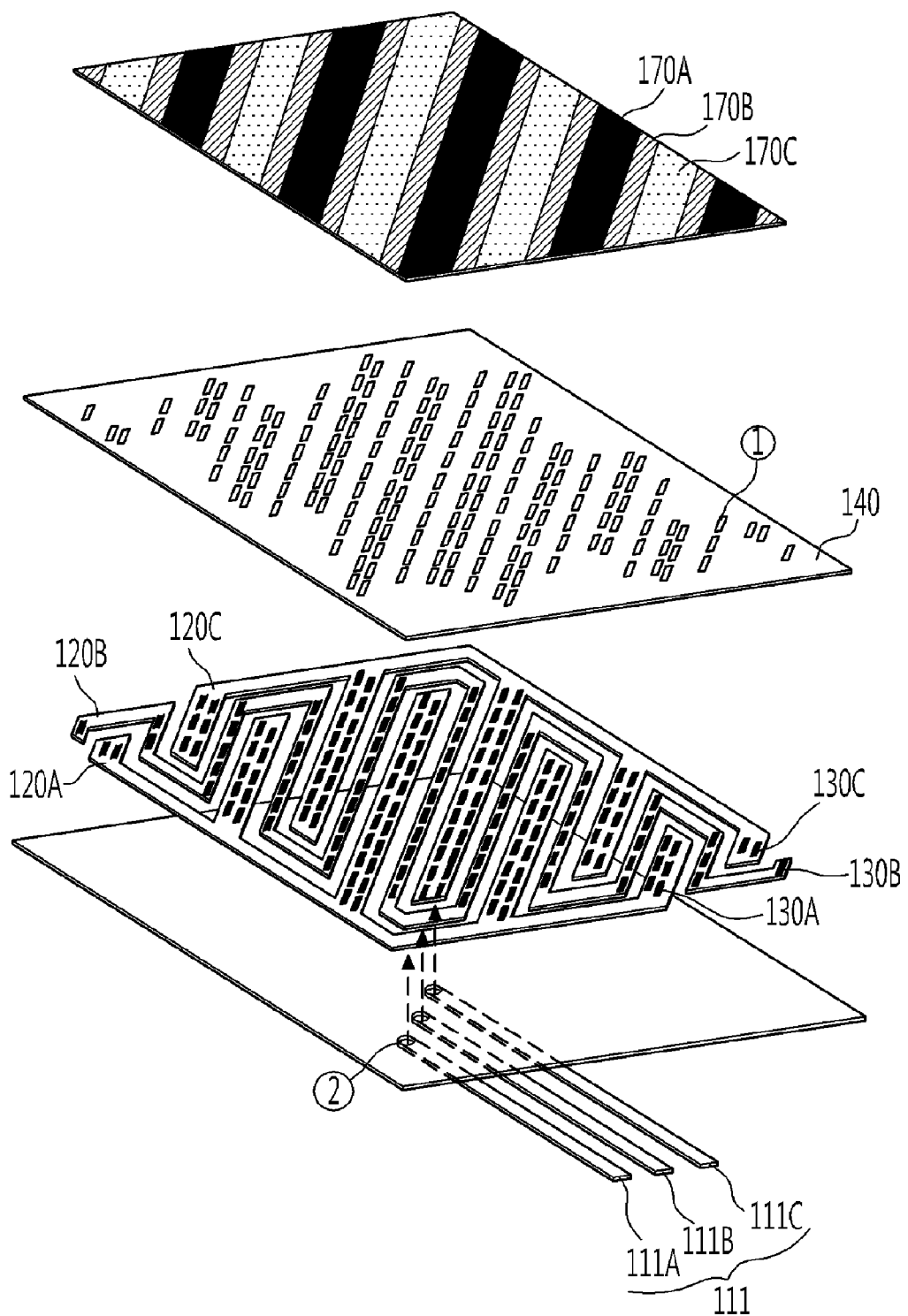
FIG. 6 illustrates the configuration of unit blocks of an FEL according to an exemplary embodiment of the present invention, particularly when a data electrode is included to individually control a plurality of unit blocks.

FIG. 6 illustrates the configuration of unit blocks of an FEL according to an exemplary embodiment of the present invention, particularly when a data electrode is included to individually control a plurality of unit blocks.

As shown in FIG. 6, an FEL according to the exemplary embodiment of the present invention includes a plurality of unit blocks, each unit block including a plurality of data electrodes 111, a plurality of cathode electrodes 120A, 120B and 120C, a plurality of emitters 130A, 130B and 130C, and fluorescent layers 170A, 170B and 170C.

A plurality of data electrodes 111A, 111B and 111C are interposed between a first substrate 111 and the cathode electrodes 120A, 120B and 120C and insulated by an interlayer insulating layer 112. However, the data electrodes 111A, 111B and 111C are connected with the cathode electrodes 120A, 120B and 120C through an opening ②, respectively. Thus, the cathode electrodes 120A, 120B and 120C may be controlled using the data electrodes 111A, 111B and 111C.

Here, the data electrodes 111A, 111B and 111C may be formed in the form of a line extending in parallel in a predetermined direction, and the data electrodes 111A, 111B and 111C are spaced a predetermined distance from each other and thus insulated from each other.

Other components are configured in the same manner as described above, and thus the description thereof will be omitted.

According to the present invention, as an FEL having a fast response time is used as a backlight unit, a color breaking phenomenon can be prevented in a color sequential driving method.

In addition, according to the present invention, as an FEL including a plurality of unit blocks, each unit block including a plurality of cathode electrodes, a plurality of emitters, and a fluorescent layer, is used as a backlight unit, light of unit colors can be sequentially emitted, and brightness can be controlled for each block. Thus, a local dimming technique can be applied to an LCD device, thereby increasing a contrast ratio and improving afterimages.

Particularly, as RGB patterns included in the fluorescent layers are arranged alternately in an oblique direction, the problem of a specific color not being mixed on an edge of the block can be resolved.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A field emission lamp, comprising:
    a first substrate;
    a second substrate;
    a plurality of cathode electrodes formed above the first substrate;
    an anode electrode formed under the second substrate to face the cathode electrodes;
    a fluorescent layer composed of red patterns, green patterns and blue patterns (RGB patterns) formed alternately in an oblique direction; and
    a plurality of emitters formed on the cathode electrodes to correspond to the RGB patterns,
    wherein the cathode electrodes, the emitters and the fluorescent layer form at least one unit block,
    further wherein each of the RGB patterns of one of the at least one unit block is continuous, unbroken and has a longest dimension thereof extending in the oblique direction.

2. The device according to claim 1, wherein the at least one unit block includes a plurality of unit blocks.

3. The device according to claim 1, wherein the device is a backlight unit of a liquid crystal display device.

4. The device according to claim 1, further comprising a gate electrode interposed between the cathode electrodes and the anode electrode and having openings formed to correspond to the emitters.

5. The device according to claim 1, further comprising a plurality of data electrodes interposed between the first substrate and the cathode electrodes, each data electrode being connected with one of the cathode electrodes.

6. The device according to claim 1, further comprising a plurality of current controllers, each current controller being configured to control field emission current flowing through one of the cathode electrodes.

7. The device according to claim 1, further comprising a diffusion plate formed above the second substrate to mix RGB light emitted from the fluorescent layer.

8. The device according to claim 1, wherein the cathode electrodes include first, second and third cathode electrodes aligned alternately in the oblique direction, wherein the first cathode electrode is located under the red patterns, the second cathode electrode is located under the blue patterns, and the third cathode electrode is located under the green patterns.

9. The device according to claim 1, wherein the cathode electrodes include:
    a first cathode electrode having a plurality of first projections extending in the oblique direction and first connectors connecting ends of the first projections;

a second cathode electrode having a plurality of second projections extending in the oblique direction and second connectors connecting ends of the second projections, wherein the first projections and the second projections are arranged alternately; and a line-type third cathode electrode arranged between the first cathode electrode and the second cathode electrode in a zigzag form.

10. The device according to claim 9, wherein the first cathode electrode is arranged to correspond to the red pattern, the second cathode electrode is arranged to correspond to the blue pattern, and the third cathode electrode is arranged to correspond to the green pattern.

11. The device according to claim 10, wherein no other electrodes are disposed between any pair of the first, second and third cathode electrodes.

12. The device according to claim 2, wherein each edge of each of the plurality of unit blocks has one of the red patterns, one of the blue patterns and one of the green patterns arranged thereupon.

13. The device according to claim 12, wherein each of the RGB patterns of the one unit block touches another of the RGB patterns of the one unit block.

14. The device according to claim 1, wherein the RGB patterns have respective longest dimensions that are parallel to each other.

* * * * *